W. Grover,
Rod Cutter.
Nº 13,570. Patented Sep. 18, 1855.
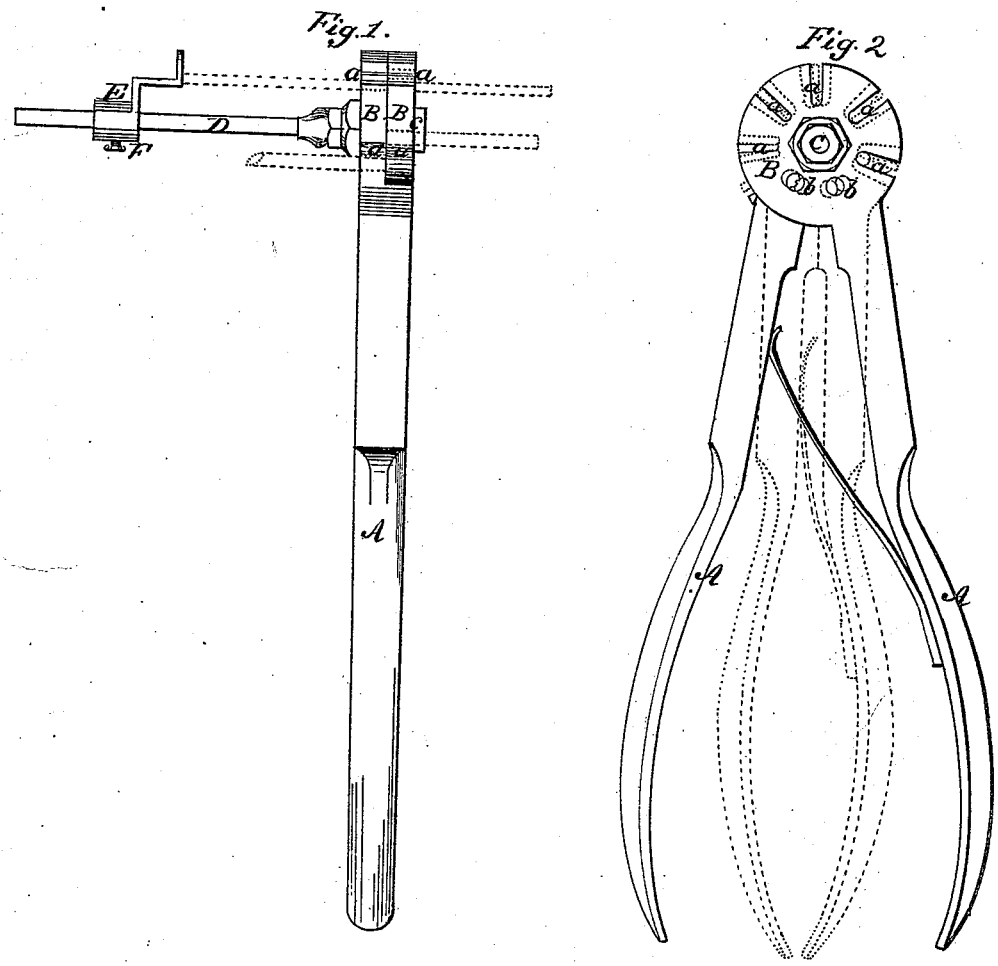

UNITED STATES PATENT OFFICE.

WILLIAM GROVER, OF HOLYOKE, MASSACHUSETTS.

CUTTING WIRE.

Specification of Letters Patent No. 13,570, dated September 18, 1855.

*To all whom it may concern:*

Be it known that I, WILLIAM GROVER, of Holyoke, in the county of Hampden and State of Massachusetts, have invented a new and Improved Implement for Cutting Wire; and I do hereby declare that the following is a full, clear, and exact description of the same, reference being had to the annexed drawings, making a part of this specification, in which—

Figure 1, is a side view of my improved implement. Fig. 2, is a face view of ditto.

Similar letters of reference indicate corresponding parts in the two figures.

The nature of my invention consists in having a series of radial slots around the fulcrum or pivot of the handles of the implement, the slots or apertures varying in size to suit different sized wire. The ends of the handles around the fulcrum or pivot, and through which the slots or apertures are made, are of circular form and of considerable thickness so as to form good bearings for the wire and prevent it from being bent as it is cut.

To enable others skilled in the art to fully understand and construct my invention, I will proceed to describe it.

A, A, represent the handles of the implement and at the end of each handle there is a circular plate B, the inner surfaces of which plates are placed against or in contact with each other and have a pin or bolt C, passing through their centers, said pin or bolt serving as a fulcrum or pivot for the handles A, A. The circular plates B, B, have radial slots (*a*) cut in them of varying size to correspond to different sized wire, the slots in both plates being precisely in line or coinciding with each other when the handles are distended.

D, Fig. 1, is a rod which is screwed into one end of the pivot C, the rod D, projecting outward from the implement at right angles with the handles or the outer surfaces of the circular plates B.

E, is a stop which works on slides upon the rod D, and is secured at any desired point upon the rod by a set screw F.

The wire to be cut is placed in one of the slots (*a*) which corresponds in size to the wire, the stop E, on the rod D, being previously adjusted so that the pieces may be all cut the desired length, that is, if pieces of the same length are required, if not, the rod may be detached from the implement. The wire is cut by pressing the handles toward each other which causes the slots (*a*) in the two plates B, B, to cross or pass each other thereby severing the wire.

The plates should be of sufficient thickness to form a good or broad bearing for the wire, so as to prevent the bending of the wire while being cut.

The above implement is simple, not liable to get out of repair, and forms a perfect and convenient "bench tool". It is far superior to the ordinary nippers as its cutting edges do not readily become impaired by use. And when after considerable use the edges of the plates become dull, they can be faced up or ground and sharpened, and will be as good as new.

The present form of wire nippers is well known, and from their peculiar construction it is impossible to repair them after once getting snipped or otherwise damaged.

My improved implement having at least four times the amount of cutting surface, over the old wire nipper, will of course be more durable, and as the wire is sustained at four points while being cut, the ends thereof will be square. Another important advantage is derived by the use of my improved implement. In consequence of the radial slots being open on the outer edges of the plates, I am enabled to cut wire to any required length, without first inserting the whole length of wire through the implement, as I should be compelled to do, if the implement was composed of dies having circular holes therein.

I am aware that a circular die has been caused to revolve, and combined with a stationary rest or semicircular forms a machine for cutting iron rods or bars. I therefore do not claim cutting wire by means of a circular die or dies.

I claim—

The use of the circular plates B having radial slots *a* formed thereon, for the purpose of holding and cutting wire, together with the gage E, constructed, and operating in the manner herein described.

WM. GROVER.

Witnesses:
 W. B. C. PEARSONS,
 R. B. JOHNSON.